(12) United States Patent
Jepsen et al.

(10) Patent No.: US 9,557,954 B2
(45) Date of Patent: Jan. 31, 2017

(54) DISPLAY PANEL USING DIRECT EMISSION PIXEL ARRAYS

(71) Applicant: Google Inc., Mountain View, CA (US)

(72) Inventors: Mary Lou Jepsen, Sausalito, CA (US); Andrei S. Kazmierski, Pleasanton, CA (US); Belle Fu, Taipei (TW); Nicholas C. Loomis, Oakland, CA (US); Behnam Bastani, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/580,682

(22) Filed: Dec. 23, 2014

(65) Prior Publication Data

US 2016/0179453 A1 Jun. 23, 2016

(51) Int. Cl.
*G06F 3/14* (2006.01)
*G09G 3/32* (2016.01)
*G09G 3/00* (2006.01)

(52) U.S. Cl.
CPC ............ *G06F 3/1446* (2013.01); *G09G 3/002* (2013.01); *G09G 3/3208* (2013.01); *G09G 2300/026* (2013.01); *G09G 2300/0439* (2013.01); *G09G 2310/0232* (2013.01)

(58) Field of Classification Search
CPC ............... H01L 27/3293; G09G 2300/026; G09G 2310/0205; G09G 2320/0233; G02F 1/13336; G06F 3/1446
USPC .................................................. 345/1.1, 1.3
See application file for complete search history.

(56) References Cited

U.S. PATENT DOCUMENTS

| | | |
|---|---|---|
| 6,370,019 B1 | 4/2002 | Matthies et al. |
| 6,476,783 B2 | 11/2002 | Matthies et al. |
| 6,853,411 B2 | 2/2005 | Freidhoff et al. |
| 6,870,519 B2 * | 3/2005 | Sundahl .............. G02F 1/13336 313/500 |

(Continued)

FOREIGN PATENT DOCUMENTS

| | | |
|---|---|---|
| JP | 2007-519330 A | 7/2007 |
| WO | WO 2008/022464 A1 | 2/2008 |

OTHER PUBLICATIONS

InfiniLED, "Applications—InfiniLED", <http://www.infiniled.com/applications> last accessed Oct. 8, 2014, 2 pages.

(Continued)

*Primary Examiner* — Viet Pham
(74) *Attorney, Agent, or Firm* — Blakely Sokoloff Taylor & Zafman LLP (57) ABSTRACT

A display panel includes a carrier substrate, a system interconnect, and a plurality of display modules disposed across the carrier substrate. The display modules are each communicatively coupled to the system interconnect to each output a different portion of an overall image communicated via the system interconnect. Each of the display modules includes an array of direct emission display pixels and a module interconnect to couple the array of direct emission display pixels to the system interconnect. The array of direct emission display pixels of a given display module of the plurality of display modules is distinct and separate from the array of direct emission display pixels of other display modules of the plurality of display modules.

17 Claims, 6 Drawing Sheets

(56) References Cited

U.S. PATENT DOCUMENTS

| | | | |
|---|---|---|---|
| 7,864,136 B2* | 1/2011 | Matthies | G02F 1/13336 345/1.1 |
| 7,995,002 B2 | 8/2011 | Miller et al. | |
| 9,261,723 B1* | 2/2016 | Budni | G02F 1/133524 |
| 2002/0080302 A1 | 6/2002 | Dubin et al. | |
| 2004/0207315 A1* | 10/2004 | Robbie | G09G 3/3216 313/504 |
| 2006/0007369 A1* | 1/2006 | Jin | G02F 1/13336 349/58 |
| 2006/0108913 A1 | 5/2006 | Cok | |
| 2012/0236217 A1 | 9/2012 | Kitai | |
| 2013/0279012 A1 | 10/2013 | Lee et al. | |

OTHER PUBLICATIONS

Wikipedia, "Crystal LED", Wikipedia, the free encyclopedia, <http://en.wikipedia.org/w/index.php?title=Crystal_LED&printable=yes> last accessed Oct. 8, 2014, 2 pages.

mLED, "Direct imaging solutions—experience the mLED difference", Direct imaging technology, Pico projectors <http://www.mled-ltd.com/what-i-do/> last accessed Oct. 8, 2014, 2 pages.

InfiniLED, "μLED—Addressable Arrays", Specification Sheet V1.1—Nov. 5, 2009, <http://www.infiniled.com> last accessed Oct. 8, 2014, 2 pages.

Lumiode light engines, Home, Welcome to Lumiode! <http://www.lumiode.com> last accessed Oct. 8, 2014, 2 pages.

mLED, "mLED: demonstrating the power of the micro LED", Micro LED demonstration kits, <http://www.mled-ltd.com/what-i-do/demonstrating-the-power-of-micro-led/> last accessed Oct. 8, 2014, 3 pages.

mLED, "Micro displays that offer clarity in demanding conditions", Micro LED display applications, Embedded imaging, <http://www.mled-ltd.com/what-i-do/micro-led-applications-precision-displays-in-demanding-conditions/> last accessed Oct. 8, 2014, 2 pages.

mLED, "mLED: leading edge technology providing uniqueness", <http://www.mled-ltd.com/what-i-do/overview/> last accessed Oct. 8, 2014, 3 pages.

InfiniLED, "Tech Brief", Single Pixel Emitter, Version 1.0 <http://www.infiniled.com> last accessed Oct. 8, 2014, 3 pages.

InfiniLED, "Technology—InfiniLED", htttp://www.infiniled.com/technology> last accessed Oct. 8, 2014, 1 page.

Lumiode light engines, Technology, Core Technology, <http://www.lumiode.com/technology> last accessed Oct. 8, 2014, 1 page.

mLED, "The need to talk real technology", <http://www.mled-ltd.com/the-need-to-talk-real-technology/> last accessed Oct. 8, 2014, 3 pages.

mLED, "World leading micro display brightness without compromise", <http://www.mled-ltd.com/world-leading-micro-display-brightness-without-compromise/> last accessed Oct. 8, 2014, 3 pages.

PCT/US2015/062440—International Search Report & Written Opinion, issued Apr. 12, 2016, 8 pages.

* cited by examiner

illustrating how different portions of a unified image are seamlessly stitched together, in accordance with an embodiment of the disclosure.

DISPLAY PANEL USING DIRECT EMISSION PIXEL ARRAYS

TECHNICAL FIELD

This disclosure relates generally to display panels.

BACKGROUND INFORMATION

Large wall displays can be prohibitively expensive as the cost to manufacture display panels rises exponentially with monolithic display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

Figure 1A:
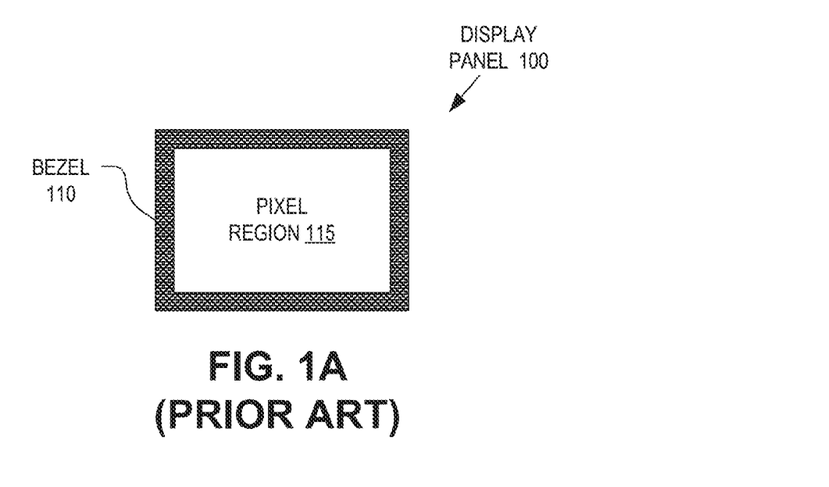
FIGS. 1A & 1B (PRIOR ART) illustrate conventional display panel tiling.
Figure 1B:
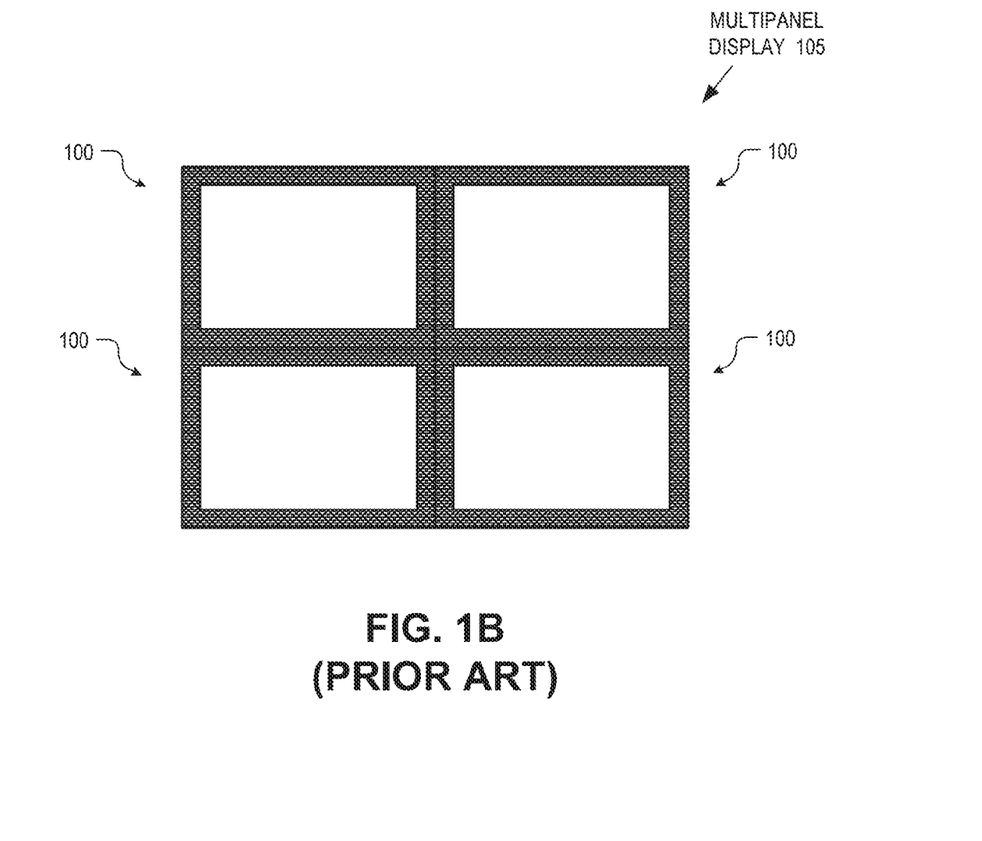

FIGS. 1A and 1B illustrate how tiling multiple smaller, less expensive display panels 100 together can achieve a large multi-panel display 105, which may be used as a large wall display. The individual images displayed by each display panel 100 may constitute a sub-portion of the larger overall composite image collectively displayed by multi-panel display 105. While multi-panel display 105 can reduce costs, visually it has a major drawback. Each display panel 100, includes a bezel 110 around its periphery. Bezel 110 is a mechanical structure that houses pixel region 115 in which the display pixels are disposed. In recent years, manufactures have reduced the thickness of bezel 110 considerably to less than 2 mm. However, even these thin bezel trims are still very noticeable to the naked eye, distract the viewer, and otherwise detract from the overall visual experience.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 5 is a perspective view of a rear projection display panel formed from a plurality of display modules and

DETAILED DESCRIPTION

Embodiments of a system, apparatus, and method of operation for a display panel using direct emission pixel arrays are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2A:
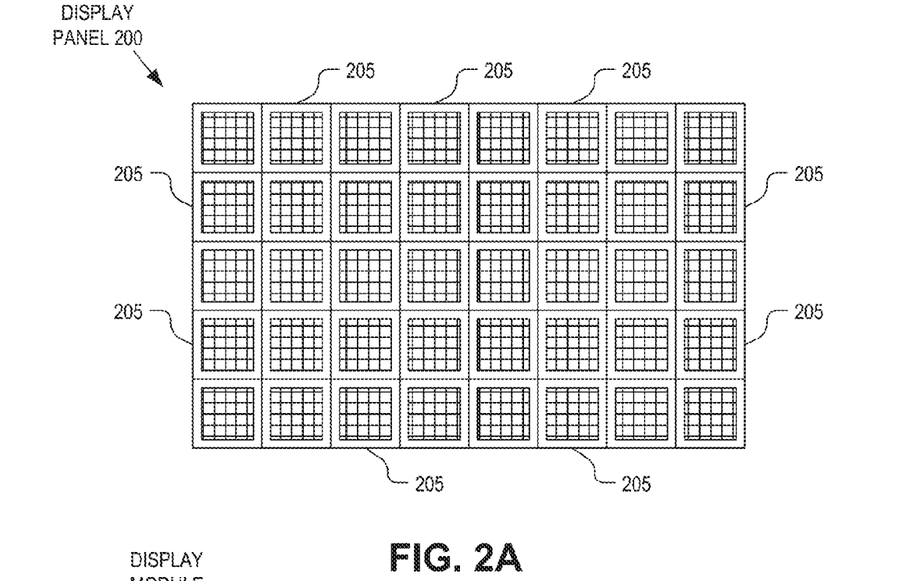
FIG. 2A illustrates a display panel formed from a plurality of display modules, in accordance with an embodiment of the disclosure.
Figure 2B:
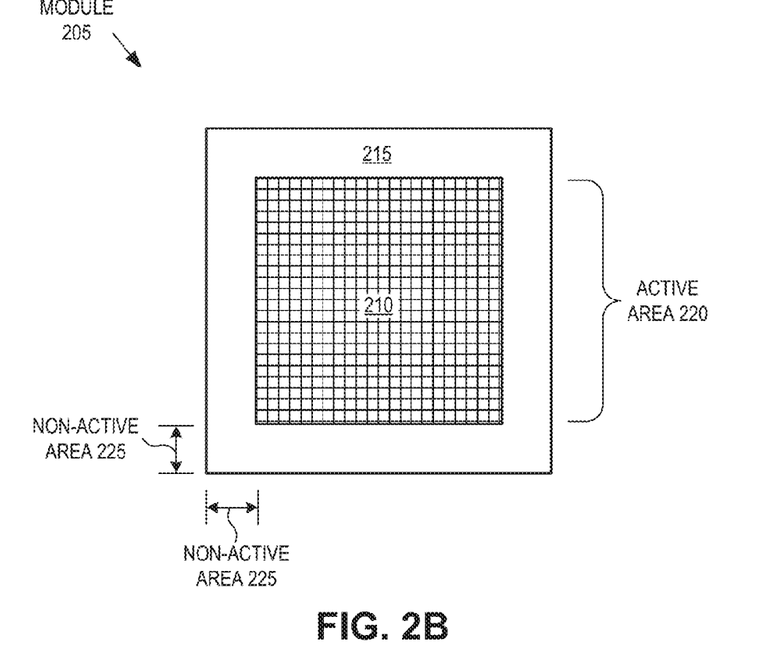
FIG. 2B illustrates a display module including an array of direct emission display pixels, in accordance with an embodiment of the disclosure.

FIG. 2A illustrates a display panel 200 formed from a plurality of display modules 205, in accordance with an embodiment of the disclosure. FIG. 2B illustrates a representative display module 205, in accordance with an embodiment of the disclosure. Each display module 205 includes an array of direct emission display pixels 210 surrounded by a casing (or encapsulant) 215. Direct emission display pixels 210 form the active area 220 of each display module 205 while casing 215 forms a non-active area 225.

Display panel 200 is formed by disposing a matrix or two-dimensional ("2D") array of display modules 205 across a carrier substrate that holds the display modules 205 together. Display modules 205 are individually addressable and communicatively coupled via a system interconnect to display circuitry and a power source. The display circuitry and power source drive each display module 205 with a discrete source image to output a different portion of a unified image. As discussed in further detail below, the image portions output by display modules 205 may be stitched or tiled together to present a viewer with a substantially seamless unified image.

Each array 210 is a distinct and separate array of display pixels from its neighboring arrays 210. As mentioned, arrays 210 are formed using direct emission display pixels. For example, in one embodiment, arrays 210 are micro light emitting diode ("LED") arrays. In another embodiment, arrays 210 are organic LED ("OLED") arrays. In yet another embodiment, arrays 210 are vertical-cavity surface-emitting lasers ("VCSEL") arrays. Micro-LED, OLED, and VCSEL arrays are direct emission displays because the individual display pixels do not share a common backlight or lamp source. Rather, each display pixel in a given array of direct emission display pixels 205 directly generates its own light. Direct emission display pixels often have high contrast ratios, since pixels not displaying image light can be disabled and therefore output no light. Correspondingly, directly emission display pixels can also have high operating efficiencies, since pixels displaying black are simply disabled, rather than actively enabled to block a continuously operating backlight. By merging independent backlight units and display layers, the mechanical thickness and complexity of the overall display panel is reduced.

Micro-LED displays and OLED displays are currently relatively expensive display architectures. Accordingly, these technologies are typically only implemented in small screen devices. Larger OLED displays are commercially available, but are several times more expensive than competing liquid crystal ("LCD") displays. Accordingly, embodiments of this disclosure reduce manufacturing costs of large display panels using direct emission display pixels by tiling display modules 205 onto a carrier substrate and stitching their output image portions into a seamless unified image. By fabricating a larger display panel from a matrix of smaller, distinct arrays of direct emission display pixels, yield rates are increased during fabrication. If a particular part is determined to contain an unacceptable number of manufacturing defects, then only a small display module 205 is disposed of, rather than an entire display panel 200.

In one embodiment, display panel 200 includes 100 display modules 205. If display panel 200 were used to create a high-definition ("HD") resolution (e.g., 1920×1080 pixels) display system, then each array 210 of a given display module 205 could be implemented as a 144×144 pixel array (1920×1080=2,073,600 pixels/100 display modules=20,736 pixel per display module=144×144 rows and columns per display module). Of course, other numbers of display modules 205 having smaller or larger pixel arrays may be implemented.

Figure 2C:
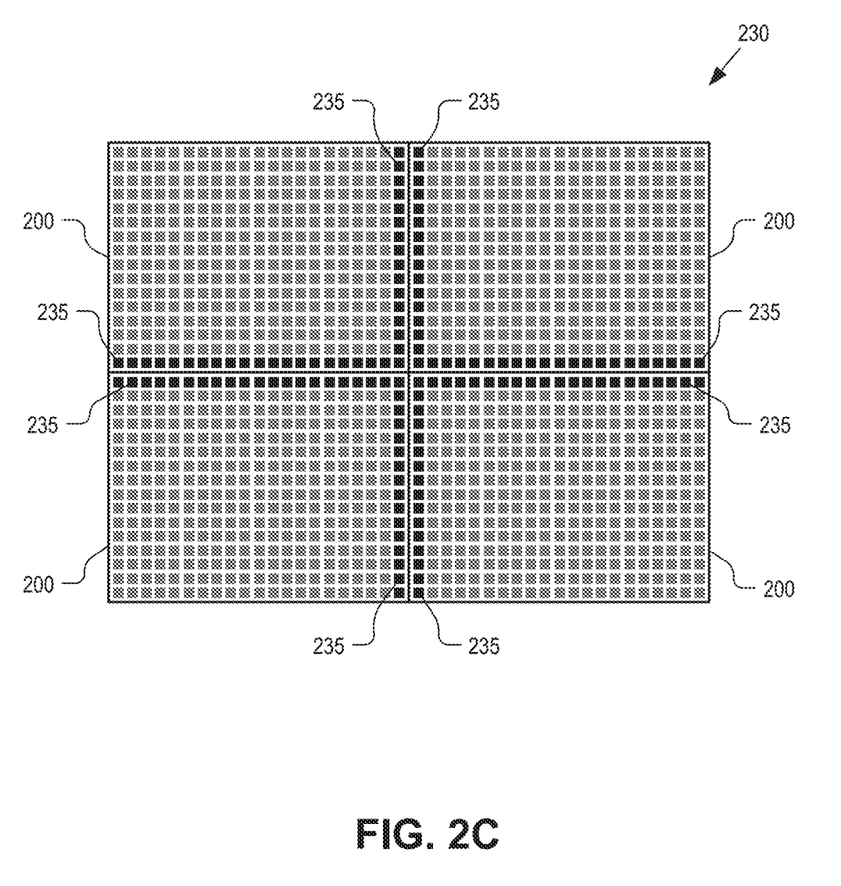
FIG. 2C illustrates a seamless multi-panel display formed by tiling display panels, in accordance with an embodiment of the disclosure.
Figure 4:
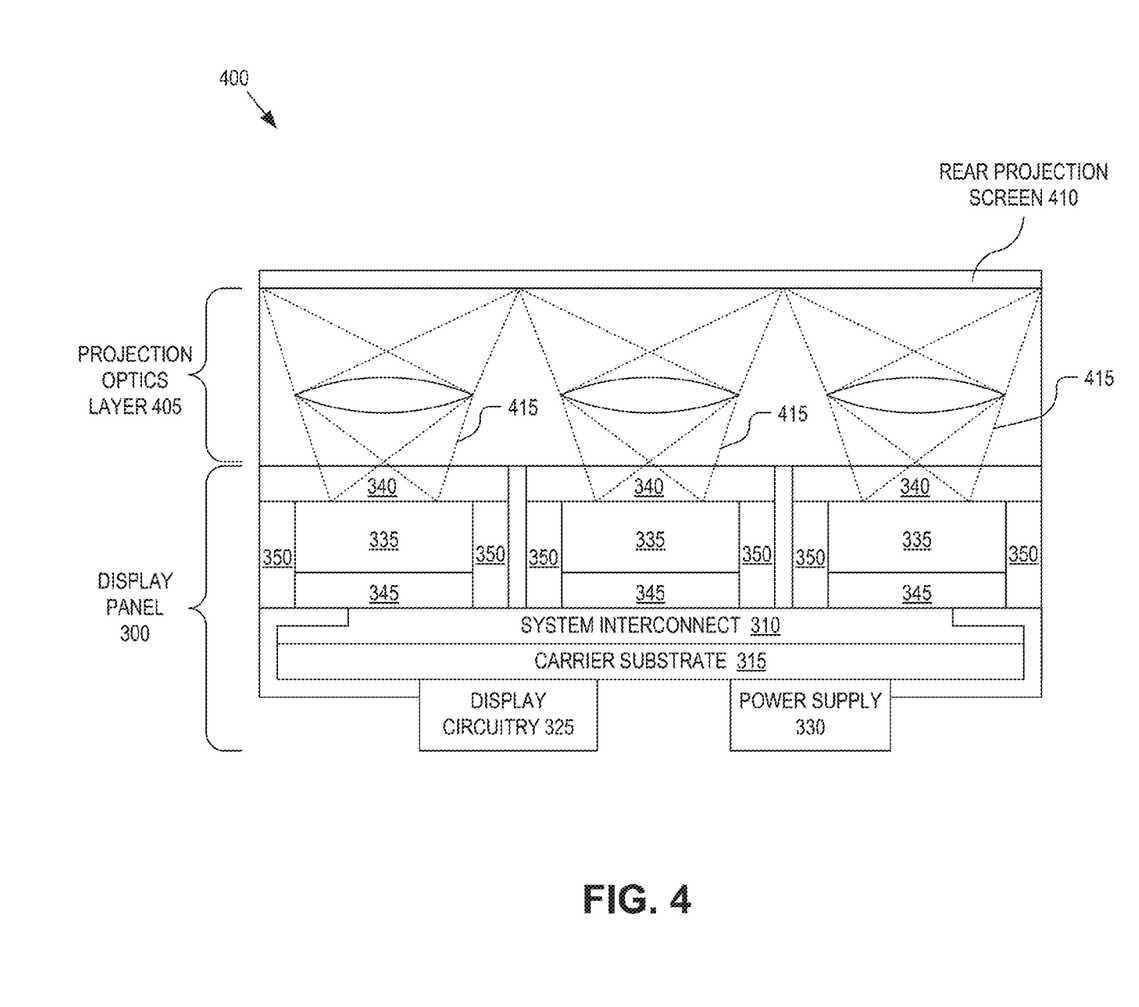
FIG. 4 is a cross-sectional illustration of a rear projection display panel formed from a plurality of display modules, in accordance with an embodiment of the disclosure.
Figure 5:
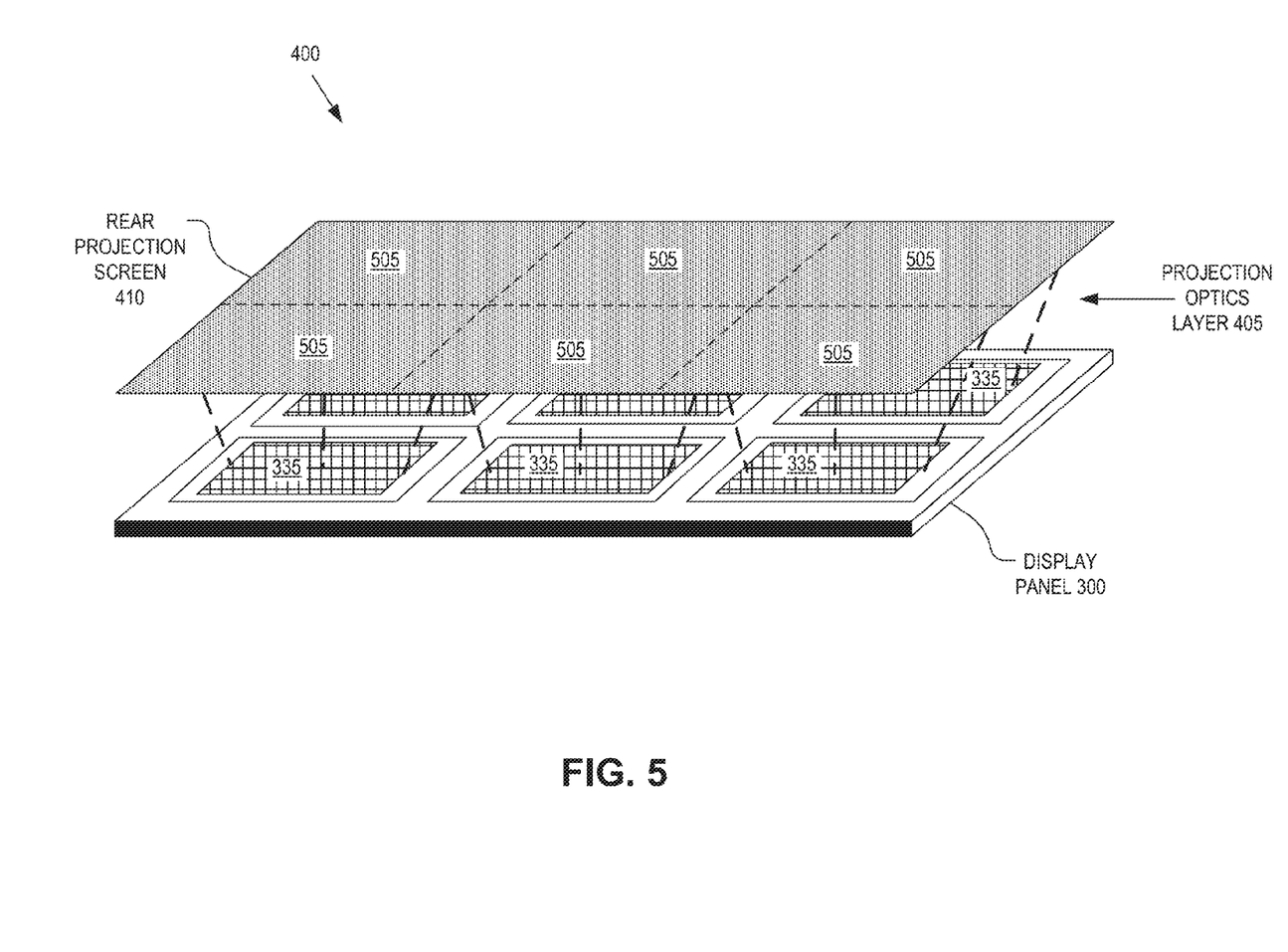

FIG. 2C illustrates how individual display panels 200 can be tiled to form even larger multi-panel displays 230, in accordance with an embodiment of the disclosure. Various techniques can be used to reduce the appearance of seams between tiled display panels 200. For example, in one embodiment, display circuitry can be configured to increase the brightness bias of perimeter display pixels 235 relative to the brightness bias of interior display pixels. Increasing the brightness bias of perimeter display pixels 235 compensates for the lack to emission light at the seam or gap between adjacent display panels 200. This increased luminosity visually masks the darker seams or gaps. Although FIG. 2C illustrates just one perimeter pixel row or perimeter pixel column immediately adjacent to another display panel 200 having their brightness bias increased, in various other embodiments, the brightness bias of multiple pixels deep may be increased to mask an inter-panel gap. This perimeter pixel brightness bias technique can also be extended to individual display modules 205 to mask the intra-panel gaps between adjacent display modules 205. FIGS. 4 and 5 (discussed in greater detail below) illustrate another embodiment capable of obscuring seams between display modules and/or entire tiled display panels.

Figure 3A:
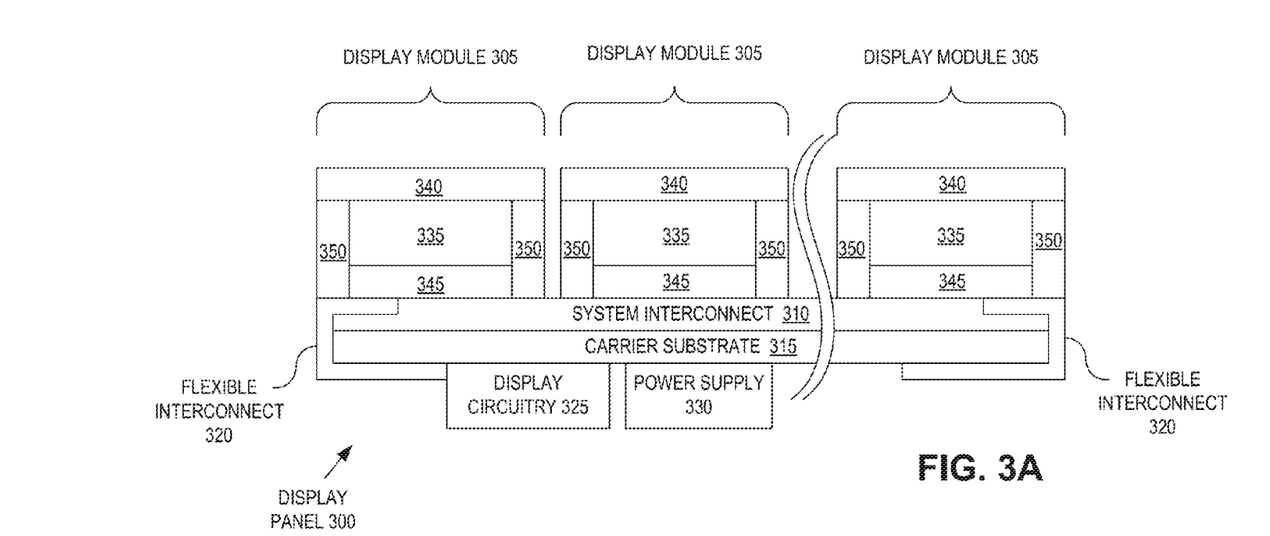
FIG. 3A is a cross-sectional illustration of a display panel formed from a plurality of display modules, in accordance with an embodiment of the disclosure.
Figure 3B:
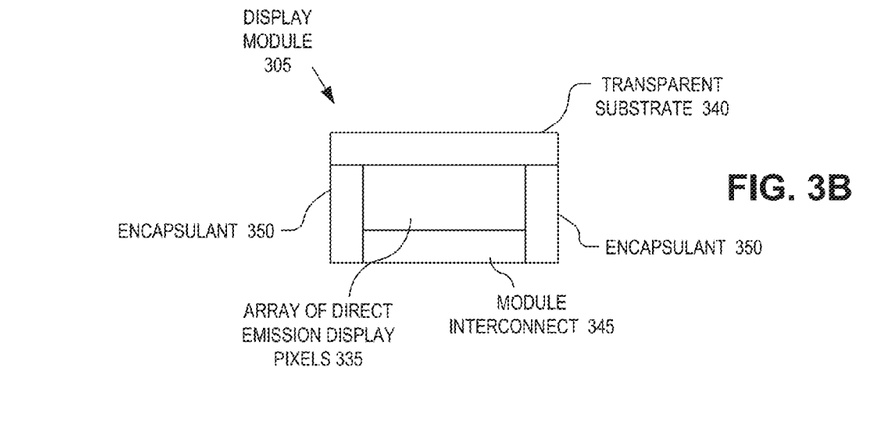
FIG. 3B is a cross-sectional illustration of a display module including an array of direct emission display pixels, in accordance with an embodiment of the disclosure.

FIG. 3A is a cross-sectional illustration of a display panel 300 formed from a plurality of display modules 305 while FIG. 3B illustrates a single representative display module 305, in accordance with an embodiment of the disclosure. Display panel 300 is one possible implementation of display panel 200 and display module 305 is one possible implementation of display module 205. The illustrated embodiment of display panel 300 includes display modules 305, a system interconnect 310, a carrier substrate 315, flexible interconnects 320, display circuitry 325, and power supply circuitry 330. The illustrated embodiments of display modules 305 each include an array of direct emission display pixels 335, a transparent substrate 340, a module interconnect 345, and an encapsulant 350.

Display modules 305 are disposed across carrier substrate 315 in a matrix or 2D pattern to form a larger display panel from an array of smaller, discrete display modules 305. Each display module 305 generates a different image portion, which are seamlessly stitched together to form a larger unified image.

In the illustrated embodiment, display circuitry 325 and power supply 330 are disposed on the backside of carrier substrate 315 opposite display modules 305. In the illustrated embodiment, power, control, and data signals are communicated around to the frontside of cattier substrate 315 via flexible interconnects 320. In other embodiments, through substrate vias may be disposed strategically across carrier substrate 315 to communicate power, control, and data signals directly through carrier substrate 315. In the illustrated embodiment, the opposite end of flexible interconnects 320 couple to signal paths within system interconnect 310. System interconnect 320 then couples to module interconnects 345 of each display module 305 to deliver power, control, and/or data signals thereto.

In one embodiment, system interconnect 310 is a patterned metal contact layer disposed on carrier substrate 315. Carrier substrate 315 may be implemented as a glass substrate, a printed circuit board, or otherwise. Similarly, in one embodiment, module interconnect 345 of each display module 305 includes a patterned metal contact layer. Electrical contact pads on each of the system interconnect 310 and module interconnects 345 are patterned to align and mate with each other to form electrical connections between system interconnect 310 and display modules 305. In various embodiments, both system interconnect 310 and/or module interconnects 345 may include additional electronics, such as thin film transistors ("TFTs") to facilitate addressing and/or driving the individual display pixels of the arrays of direct emission display pixels 335.

Each array of direct emission display pixels 335 is driven by display circuitry 325 to output a different portion of the unified image output from display panel 300. Accordingly, each array 335 may have significantly fewer pixels than the total pixel count of the overall display panel 300. For example, each array 335 may be implemented as a 144×144 pixel array. Of course, other array sizes may be implemented.

As previously described, arrays 335 may be implemented using a variety of different direct emission display technologies, including OLED pixel arrays or micro-LED pixel arrays. In the case of micro-LED arrays, color pixel arrays may be implemented using a repeating pattern of color (e.g., red, green, blue) LEDs to form pixel units. In another embodiment, arrays 335 may be implemented using an array of blue LEDs that are overlaid with a color conversion layer (e.g., phosphorus layer or quantum dot layer) to converts the blue light to white light and a tri-color filter layer disposed over the color conversion layer that achieves a multi-color pixel array. In yet another embodiment, arrays 335 may be implemented using an array of white LEDs and a color filter matrix.

Transparent substrates 340 cap off and protect arrays 335. Transparent substrates 340 may be fabricated using a variety of transparent materials including glass or plastic. Encapsulant 350 is disposed around the perimeter edges of display modules 305 to hold and seal the components of display modules 305 together. Thus, encapsulants 350 operate as both a sealant and a mechanical adherent. In one embodiment, encapsulants 350 are formed using a glue, curable polymer, or otherwise. In other embodiments, encapsulants 350 may be a rigid bezel, such as a metal or plastic housing.

Alternatively, encapsulants 350 may be formed from a pliable gasket (e.g., rubber or silicon gasket). By keeping the thickness of encapsulant 350 less than a few hundred micrometers (e.g., a 100 um), the gap between active areas of adjacent display modules 305 can be virtually unnoticeable and further visually masked by manipulating the brightness bias of the perimeter pixels, as discussed above. Alternatively, other tiling techniques can be implemented, which are capable of masking larger inter-module gaps between the active areas of display modules 305.

FIG. 4 is a cross-sectional illustration of a rear projection display panel 400 formed with a plurality of display modules and a rear projection screen, in accordance with an embodiment of the disclosure. FIG. 5 illustrates a partially exploded perspective view of rear projection display panel 400. The illustrated embodiment of rear projection display panel 400 includes display panel 300, a projection optics layer 405, and a rear projection screen 410. Projection optics layer 405 has been omitted from FIG. 5 so as not to obscure other aspects of the illustration.

Rear projection display panel 400 uses projection optics layer 405 and rear projection screen 410 to seamlessly tile display modules 305 and visually mask intra-panel gaps between adjacent display modules 305. Additionally, projection optics layer 405 and 410 further facilitate seamless tiling of multiple display panels and visual masking of inter-panel gaps between adjacent display panels. It should be appreciated that the seamless stitching technique illustrated in FIGS. 4 and 5 can be used in connection with, or independent of, the seamless stitching technique illustrated in FIG. 2C that increases the relative brightness of perimeter display pixels.

The illustrated embodiment of projection optics layer 405 includes magnification lenses that magnify display light 415 output from display panel 300. Projection optics layer 405 expands the lateral extent of display light 415 output from each array 335 to form image portions 505 on rear projection screen 410. In various embodiments, rear projection screen 410 includes matte material (or other diffusing material suitable for rear projection) that is disposed on a transparent substrate providing mechanical support. Other rear projection screen technologies may also be used in place of, or in addition to, a simple matte material to increase image contrast and/or viewing angle.

Image portions 505 collectively blend together on rear projection screen 410 to present a unified image to a viewer from the viewing side of the screen that is substantially without seams. In other words, the image portions created by array 335 are magnified as they are projected across projection optics layer 405 between rear projection screen 410 and display panel 300. The image portions 505 are magnified enough to extend over and cover the gaps between the active areas of arrays 335 and the gaps along the perimeter of display panel 300 when tiling display panel 300 with other display panels. The magnification factor is dependent upon the thickness of projection optics layer 405 and the optical power of the projection optics. In one embodiment, image portions 505 are magnified by a factor of approximately 1.5. In other embodiments the magnification can be less than or greater than 1.5. The magnification factor should be sufficient to obscure the inter-module gaps, which can be substantially larger than the pixel pitch within a discrete array 335. When interconnecting rear projection display panel 400 with other display panels to form larger composite seamless displays, the unified image generated by a single display panel becomes a sub-portion of a multi-tile unified image.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A display panel, comprising:
   a carrier substrate;
   a system interconnect;
   a plurality of display modules disposed across the carrier substrate, the display modules each communicatively coupled to the system interconnect to each output a different portion of an overall image communicated via the system interconnect, each of the display modules including:
      an array of direct emission display pixels that forms an active area;
      a module interconnect to couple the array of direct emission display pixels to the system interconnect; and
      an encapsulant surrounding the array of direct emission display pixels, wherein the encapsulant forms a non-active area,
   wherein the array of direct emission display pixels of a given display module of the plurality of display modules is distinct and separate from the array of direct emission display pixels of other display modules of the plurality of display modules,
   wherein non-active areas due to encapsulants surrounding each of the active areas form gaps between adjacent active areas of the display modules that are greater than inter-pixel separations within the active areas;
   a rear projection screen disposed over emission sides of the plurality of display modules; and
   a projection optics layer disposed between the rear projection screen and the plurality of display modules, the projection optics layer including a plurality of lenses each aligned with one of the display modules to magnify a corresponding one of the different portions of the overall image onto the rear project screen such that the different portions substantially seamlessly stitch together onto the rear projection screen to form the overall image and obscure the gaps between the display modules.

2. The display panel of claim 1, wherein the array of direct emission display pixels comprise one of an organic light emitting diode ("OLED") array, a micro-LED array, or an array of vertical-cavity surface-emitting lasers ("VCSELs").

3. The display panel of claim 1, wherein the encapsulant surrounds the array of direct emission display pixels and the module interconnect to seal and to hold the array of direction emission display pixels to the module interconnect.

4. The display panel of claim 3, wherein the encapsulant comprises at least one of a glue, a bezel, or a housing that surrounds a perimeter of the array of direct emission display pixels and the module interconnect.

5. The display panel of claim 3, wherein each of the display modules further includes:
a transparent substrate overlaying an emission side of the array of direct emission display pixels.

6. The display panel of claim 1, wherein the system interconnect comprises a first patterned metal contact layer that extends between the carrier substrate and the plurality of display modules.

7. The display panel of claim 6, wherein the module interconnect comprises a second patterned metal contact layer having first contacts that align with and electrically connect to second contacts of the system interconnect disposed on the carrier substrate.

8. The display panel of claim 6, further comprising:
a flexible interconnect coupled to first contacts on the patterned metal contact layer at a first end, wherein the flexible interconnect wraps around peripheral edges of the system interconnect and the carrier substrate to provide second contacts on a backside of the carrier substrate for providing signal or power connections to the plurality of display modules.

9. The display panel of claim 1, further comprising:
display circuitry coupled to drive the plurality of display modules via the system interconnect, wherein the display circuitry is configured to increase a first brightness bias of perimeter display pixels relative to a second brightness bias of interior display pixels of each of the array of direct emission display pixels, wherein the perimeter display pixels are adjacent to gaps between the plurality of display modules and the first brightness bias is increased to visually mask the gaps.

10. A multi-panel display system, comprising:
a plurality of display panels aligned to each other and communicatively coupled to collectively display a unified image across the display panels, wherein each of the display panels includes:
a carrier substrate;
a system interconnect; and
a plurality of display modules disposed across the carrier substrate, the display modules each communicatively coupled to the system interconnect to each output a different portion of an overall image communicated via the system interconnect, each of the display modules including:
an array of direct emission display pixels that forms an active area;
a module interconnect to couple the array of direct emission display pixels to the system interconnect;
a transparent substrate overlaying an emission side of the array of direct emission display pixels, wherein the array of direct emission display pixels is disposed between the transparent substrate and the module interconnect; and
an encapsulant surrounding the array of direct emission display pixels, wherein the encapsulant forms a non-active area, wherein the encapsulant comprises a glue or a curable polymer that extends around perimeter side edges of the array of direct emission display pixels and seals the transparent substrate to the module interconnect,
wherein the array of direct emission display pixels of a given display module of the plurality of display modules is distinct and separate from the array of direct emission display pixels of other display modules of the plurality of display modules,
wherein non-active areas due to encapsulants surrounding each of the active areas form gaps between adjacent active areas of the display modules that are greater than inter-pixel separations within the active areas.

11. The multi-panel display system of claim 10, wherein the array of direct emission display pixels comprise one of an organic light emitting diode ("OLED") array, a micro-LED array, or an array of vertical-cavity surface-emitting lasers ("VCSELs").

12. The multi-panel display system of claim 10, wherein the encapsulant surrounds the array of direct emission display pixels and the module interconnect to seal and to hold the array of direction emission display pixels to the module interconnect.

13. The multi-panel display system of claim 10, wherein the system interconnect comprises first a patterned metal contact layer that extends between the carrier substrate and the plurality of display modules.

14. The multi-panel display system of claim 13, wherein the module interconnect comprises a second patterned metal contact layer having first contacts that align with and electrically connect to second contacts of the system interconnect disposed on the carrier substrate.

15. The multi-panel display system of claim 13, wherein each of the display panels further includes:
a flexible interconnect coupled to first contacts on the patterned metal contact layer at a first end, wherein the flexible interconnect wraps around peripheral edges of the system interconnect and the carrier substrate to provide second contacts on a backside of the carrier substrate for providing signal or power connections to the plurality of display modules.

16. The multi-panel display system of claim 10, wherein each of the display panels further includes:
a rear projection screen disposed over emission sides of the plurality of display modules; and
a projection optics layer disposed between the rear projection screen and the plurality of display modules, the projection optics to magnify each of the different portions of an overall image onto the rear project screen such that the different portions substantially seamlessly stitch together onto the rear projection screen to form the overall image and obscure gaps between the plurality of display modules.

17. The multi-panel display system of claim 10, wherein each of the display panels further includes:
display circuitry coupled to drive the plurality of display modules via the system interconnect, wherein the display circuitry is configured to increase a first brightness bias of perimeter display pixels relative to a second brightness bias of interior display pixels of each of the array of direct emission display pixels, wherein the perimeter display pixels are adjacent to gaps between the plurality of display modules and the first brightness bias is increased to visually mask the gaps.

* * * * *